(12) United States Patent
Tang et al.

(10) Patent No.: US 11,423,101 B2
(45) Date of Patent: Aug. 23, 2022

(54) KEYWORD GENERATION AND VERIFICATION SYSTEM

(71) Applicant: AVIVID INNOVATE MEDIA CO., LTD, Taipei (TW)

(72) Inventors: Yu Ju Tang, Taipei (TW); Meng Xiang Chen, Taipei (TW)

(*) Notice: Subject to any disclaimer, the term of this patent is extended or adjusted under 35 U.S.C. 154(b) by 0 days.

(21) Appl. No.: 17/321,539

(22) Filed: May 17, 2021

(65) Prior Publication Data

US 2022/0215058 A1 Jul. 7, 2022

(30) Foreign Application Priority Data

Jan. 4, 2021 (TW) .................. 110100119

(51) Int. Cl.
G06F 16/30 (2019.01)
G06F 16/953 (2019.01)
G06F 16/955 (2019.01)
G06F 16/951 (2019.01)

(52) U.S. Cl.
CPC .......... *G06F 16/953* (2019.01); *G06F 16/951* (2019.01); *G06F 16/9566* (2019.01)

(58) Field of Classification Search
CPC ... G06F 16/953; G06F 16/9566; G06F 16/951
See application file for complete search history.

(56) References Cited

U.S. PATENT DOCUMENTS

| | | | | |
|---|---|---|---|---|
| 2009/0299998 | A1* | 12/2009 | Kim ...................... | G06F 16/951 707/999.005 |
| 2012/0281911 | A1* | 11/2012 | Fung .................... | H04L 51/212 382/199 |
| 2015/0169584 | A1* | 6/2015 | Kwok ............... | G06F 16/24578 707/730 |
| 2021/0374797 | A1* | 12/2021 | Hasan .................... | G06N 3/084 |
| 2022/0092129 | A1* | 3/2022 | Fox ....................... | G06F 16/951 |

* cited by examiner

*Primary Examiner* — Mahesh H Dwivedi

(57) ABSTRACT

A keyword generation and verification system can extract a plurality of keyword data from a webpage data, which provided by website manager. The system will perform the first analysis to select available keyword data via keyword analysis system. These keyword data will be displayed on a search engine, which is embedded in an external website for consumer to click. The browse track of the consumer will be tracked to perform the second analysis availability of the keyword data after the keyword data is clicked by the consumer.

6 Claims, 4 Drawing Sheets

KEYWORD GENERATION AND VERIFICATION SYSTEM

BACKGROUND OF THE INVENTION

1. Field of the Invention

The present invention relates to a verification system, in particular, to a keyword generation and verification system

2. Description of the Prior Art

Keywords and tags are commonly-used means in web technology, and their purpose is to connect associated webpages to allow reviewers to quickly browse the associated webpages. During search, the corresponding webpages or products can also be found through keywords.

Currently, keywords and tags are mostly artificially added, such as the symbol "#" commonly found on social networking sites. How to choose these keywords is mostly determined by the special purpose or experience of the posters. Furthermore, the usability is evaluated by the number of times the keyword has been clicked or searched.

However, the evaluation of keywords still requires manual processing, such as experience judgment or the use of statistical tools, which requires personnel to judge each keyword one by one. Especially in recent years, Internet marketing methods have become more and more diversified, making it more and more difficult to judge the usability of keywords.

Therefore, how to solve the above problems is worth considering for those with ordinary knowledge.

SUMMARY OF THE INVENTION

The purpose of the present invention is to provide a keyword generation and verification system, which can verify the usability of keywords through external tools and consumer behaviors. The technical means used in the present invention are as follows:

A keyword generation and verification system is proposed in the present invention.

The keyword generation and verification system is connected to an external website server and a keyword analysis system. The keyword generation and verification system includes at least one website management terminal, a server host, an embedded search engine, and a plurality of consumer terminals. The website management terminal includes a webpage input module, a first keyword input module, and a second keyword input module. The webpage input module is configured for inputting a webpage data. The first keyword input module is configured for inputting at least one keyword data, and the keyword data is marked as an in-use state. The second keyword input module is configured for inputting the keyword data, and the keyword data is marked as a not-used state. The server host is communicatively connected to the website management terminal. The server host includes a text recognition module, a first keyword database, a second keyword database, a first verification module, and an output module. The text recognition module is configured for receiving the webpage data, and analyzing the webpage data to obtain a plurality of keyword data. The first verification module is configured for: obtaining the keyword data from the first keyword input module, the second keyword input module and the text recognition module, and sending the keyword data to the keyword analysis system; providing a corresponding keyword data a score according to an analysis data fed back by the keyword analysis system; storing the keyword data with the score higher than a threshold in the first keyword database, and storing the keyword data with the score lower than the threshold in the second keyword database; and storing the keyword data marked as the in-use state in the first keyword database, and storing the keyword data marked as the not-used state in the second keyword database. The output module is configured for obtaining the keyword data with the score from the first keyword database, using the keyword data to obtain a plurality of URL links from the website server, and generating a plurality of collection pages, wherein the plurality of collection pages are corresponding to the keyword data. The embedded search engine is communicatively connected to the sever host and disposed in the website server. The embedded search engine includes a search field and a plurality of keyword fields, wherein the plurality of keyword fields is used for displaying the keyword data stored in the first keyword database. The plurality of consumer terminals is communicatively connected to the website server. The consumer terminal is configured for loading and displaying the embedded search engine when it is connected to the website server. When the keyword data in the keyword fields is clicked, the corresponding collection page is displayed on the consumer terminal. When the keyword data is inputted in the search field, a closest keyword data that is closest to the inputted keyword data is searched from the first keyword database, the corresponding collection page is displayed on the consumer terminal, and the associated keyword data is displayed in the keyword field. The server host further includes a second verification module. When the keyword data in the keyword field is clicked, the second verification module is configured for tracking a browsing trajectory of the consumer terminal on the website server, for modifying the score of the keyword data, for storing the keyword data with the score higher than the threshold value in the first keyword database, and for storing the keyword data with the score lower than the threshold value in the second keyword database. The keyword data marked as the in-use state will not be stored in the second keyword database by the first verification module or the second verification module. The keyword data marked as the not-used state will not be stored in the first keyword database by the first verification module or the second verification module.

In the above keyword generation and verification system, the keyword data stored in the second keyword database is transmitted to the first verification module and the second verification module at regular intervals to re-obtain the score.

In the above keyword generation and verification system, the first verification module is further configured for obtaining more keyword data based on the analysis data.

In the above keyword generation and verification system, when the collection pages corresponding to the plurality of keyword data have the same URL link, these keyword data will form a plurality of composite keyword data.

In the above keyword generation and verification system, when the embedded search engine is loaded by the consumer terminal, a keyword request is transmitted to the server host, a plurality of keyword data is selected from the first keyword database by the server host, and the selected keyword data is transmitted to and displayed on the embedded search engine.

In the above keyword generation and verification system, when the same keyword request are issued from different consumer terminals, the server host selects different keyword data to be displayed in the keyword fields of these consumer terminals.

The keyword generation and verification system of the present invention has the advantages of automatic verification and ability for effectively searching keywords with higher usability. At the same time, by displaying the embedded search engine on external websites, the value on websites generated by the consumer terminals is further improved.

The foregoing, as well as additional objects, features and advantages of the invention will be more readily apparent from the following detailed description, which proceeds with reference to the accompanying drawings.

DESCRIPTION OF THE PREFERRED EMBODIMENTS

In order to enable the above objects, features and advantages of the disclosure to be more apparent and easily understood, the specific embodiments of the disclosure will be further elaborated hereafter in connection with the drawings.

A keyword generation and verification system is proposed in the present invention. The quality of keywords is analyzed through external systems and consumer behaviors twice, which can gradually refine keywords that can attract clicks and bring out actual benefits.

Figure 1:
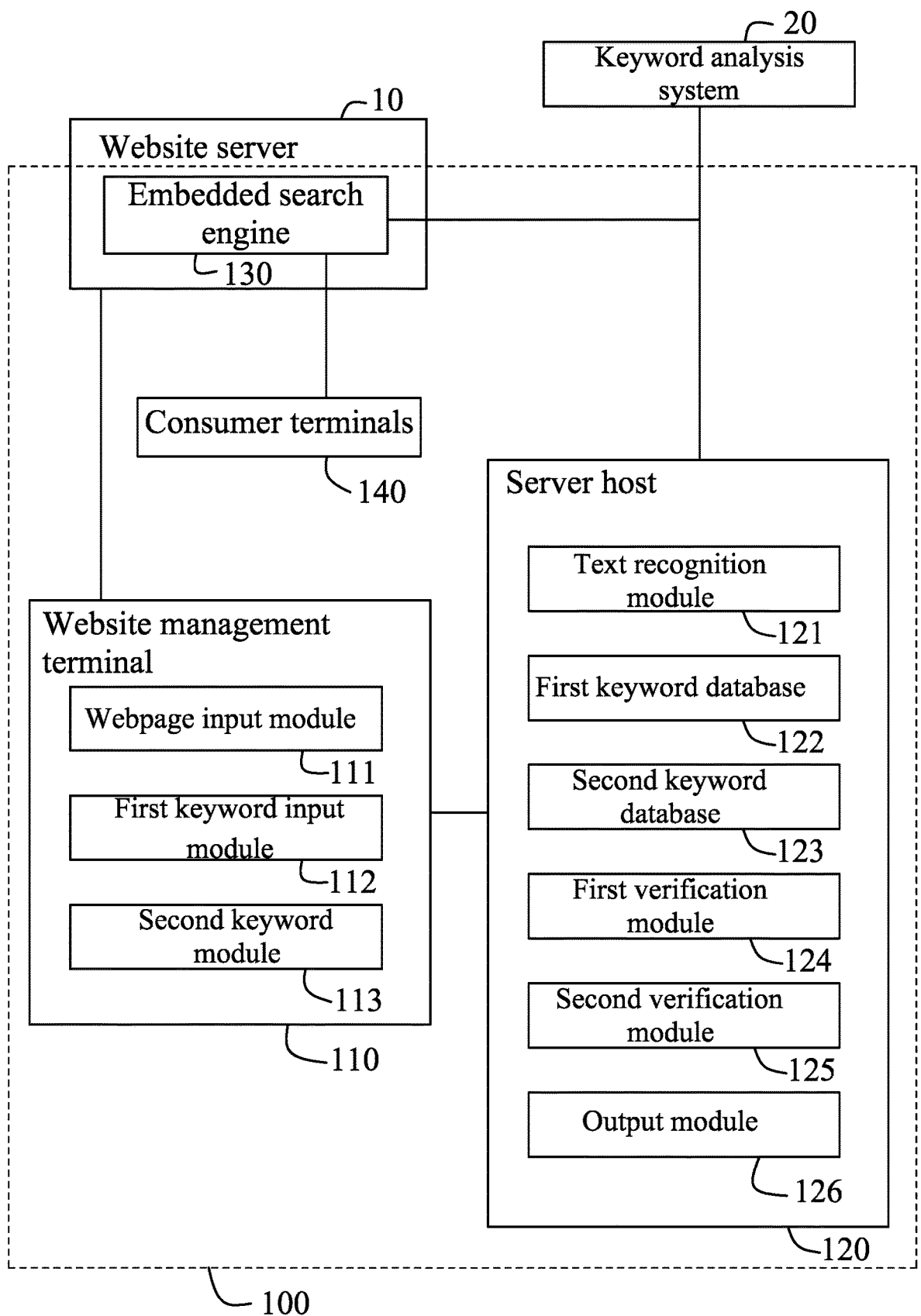
FIG. 1 is a structural diagram of a keyword generation and verification system according to an embodiment of the present invention.

Please refer to FIG. 1. FIG. 1 is a structural diagram of a keyword generation and verification system according to an embodiment of the present invention. The keyword generation and verification system 100 of the present invention is connected to an external website server 10 and a keyword analysis system 20. The website server 10 is a server for common users to browse webpages. The preferred embodiment for the website server 10 is a news website or a shopping website. Therefore, the website server 10 stores a plurality of webpage data corresponding to a plurality of webpage links. The keyword analysis system 20 is, for example, a Google search console or Google Ads, which can view search traffic and advertisement usage for specific keywords, so the keyword analysis system 20 can provide a keyword analysis result.

The keyword generation and verification system 100 of the present invention includes at least one website management terminal 110, a server host 120, at least one embedded search engine 130, and a plurality of consumer terminals 140. The website management terminal 110 and the embedded search engine 130 are communicatively connected to the server host 120. The website management terminal 110 is a device used by an administrator of the website server 10, that is, a backend device of the website. In this embodiment, the website management terminal 110 further includes a webpage input module 111, a first keyword input module 112, and a second keyword input module 113.

The webpage input module 111 is configured for inputting a webpage data. That is, when a website manager wants to add a webpage, he can input webpage data through the webpage input module 111, such as publishing a new press release or putting on a new product sales page. The inputted webpage data is not only sent to the website server 10 for browsing by the browsers, but also sent to the server host 120.

The first keyword input module 112 and the second keyword module 113 are configured for inputting at least one keyword data. Be noted, the keyword data inputted by the first keyword input module 112 is marked as an in-use state, and the keyword data inputted by the second keyword input module 113 is marked as a not-used state. That is to say, the first keyword input module 112 and the second keyword input module 113 are modules for the website administrator to input specific keywords, wherein the first keyword input module 112 is used for inputting keywords that need to be exposed, and the second keyword input module 113 is used for inputting keywords that do not need to be displayed. The keywords inputted by the first keyword input module 112 and the second keyword input module 113 are subsequently given different treatments by the server host 120.

The server host 120 is the main computing device of the keyword generation and verification system 100 of the present invention. The server host 120 can adopt a single server for computing, or can adopt several serval servers for joint computing. In this embodiment, the server host 120 includes a text recognition module 121, a first keyword database 122, a second keyword database 123, a first verification module 124, a second verification module 125, and an output module 126.

The text recognition module 121 is configured for receiving the webpage data, and analyzing the webpage data to obtain a plurality of keyword data. That is to say, when the website administrator inputs or creates a new webpage through the website management terminal 110 (such as, publishing a news article or a product page), the text recognition module 121 will find out a plurality of keywords from webpage data through text recognition, textual judgment, or text exploration. For example, events, people, locations involved in the news, or product categories and product features in the product webpage. After that, these keywords are converted into a plurality of keyword data.

The first keyword database 122 and the second keyword database 123 are configured for storing keyword data, and the keyword data stored separately by them have different purposes. That is to say, the first keyword database 122 and the second keyword database 123 respectively store keyword data with different states. Usable keyword data is stored in the first keyword database 122, and unusable keyword data is stored in the second keyword database 123.

The first verification module 124 is configured for: obtaining the keyword data from the first keyword input module 112, the second keyword input module 113 and the text recognition module 121, and sending the keyword data to the keyword analysis system 20; providing a corresponding keyword data a score according to an analysis data fed back by the keyword analysis system 20; storing the keyword data with the score higher than a threshold in the first keyword database 122, and storing the keyword data with the score lower than the threshold in the second keyword database 123. In addition, the first verification module 124 is configured for storing the keyword data marked as the in-use state in the first keyword database 122, and storing the keyword data marked as the not-used state in the second keyword database 123.

Furthermore, the first verification module 124 obtains the keyword data from the first keyword database 122, and transmits it to the external keyword analysis system 20. The analysis data returned by the keyword analysis system 20 may include a click number of the keyword, a searched number of the keyword, or a number of times the keyword has been used in advertisements. The first verification module 124 captures these data, and further gives a score to the corresponding keyword data for indicating the usability of the keyword. When the score of the keyword data is lower than the threshold, it represents that the keyword is not favored by the masses and its usability is lower. On the contrary, when the score of the keyword data is higher than the threshold, it represents that the keyword is more popular with the masses and its usability is higher.

After the first verification module 124 completes the scoring, it will also identify whether the scored keyword data is marked as the in-use state or the not-used state. The unmarked keyword data is determined to be sent to the first keyword database 122 or the second keyword database 123 based on whether the score is higher than the threshold. The keyword data marked as the in-use state is sent to the first keyword database 122, even if the score is lower than the threshold. The keyword data marked as the not-used state is sent to the second keyword database 123, even if the score is higher than the threshold.

In one embodiment, the first verification module 124 is further configured for obtaining more keyword data based on the analysis data. In other words, when the first verification module 124 identifies the analysis data, it may find associated keywords, and may convert the associated keywords into the keyword data. For example, the first verification module 124 verifies the keywords with the Google search console, and other additional keywords that appeared several times are detected on the second half of the search result webpage, and thus the additional keywords will be captured. Through this method, the first verification module 124 can expand the amount of keywords in the first keyword database 122 by itself.

After the keyword data is displayed on the embedded search engine 130 and is clicked by the consumer, the second verification module 125 may track a browsing trajectory of the consumer terminal 140 on the website server 10, and may modify the score of the keyword data. The specific description will be explained later.

The output module 126 is configured for obtaining the keyword data with the score from the first keyword database 122, using the keyword data to obtain a plurality of URL links from the website server 10, and generating a plurality of collection pages, wherein the plurality of collection pages are corresponding to the keyword data. In other words, each keyword data is accompanied by a collection page, and the collection page includes an URL link associated with the keyword data.

In one embodiment, the collection pages corresponding to a plurality of keyword data have the same URL link, and these keyword data will form a plurality of composite keyword data. In other words, if a plurality of keywords link to the same URL link (i.e., the same article or the same product), it represents that these keywords have commonality. At this time, the server host 120 will concatenate these keywords to form a composite keyword data and display it on the embedded search engine 130.

The embedded search engine 130 is communicatively connected to the sever host 120 and is disposed in the website server 10. The plurality of consumer terminals 140 is communicatively connected to the website server 10. The consumer terminal 140 is configured for loading and displaying the embedded search engine 130 when it is connected to the website server 10. The consumer terminal 140 may be a smart phone or a personal computer.

In other words, the embedded search engine 130 is one of the components of the keyword generation and verification system 100, but is installed in the website server 10 in an embedded manner. When the consumer terminal 140 connects to the website server 10 with a browser, the embedded search engine 130 will be loaded, and both the webpages of the embedded search engine 130 and the website server 10 will be displayed on the consumer terminal 140.

Figure 2:
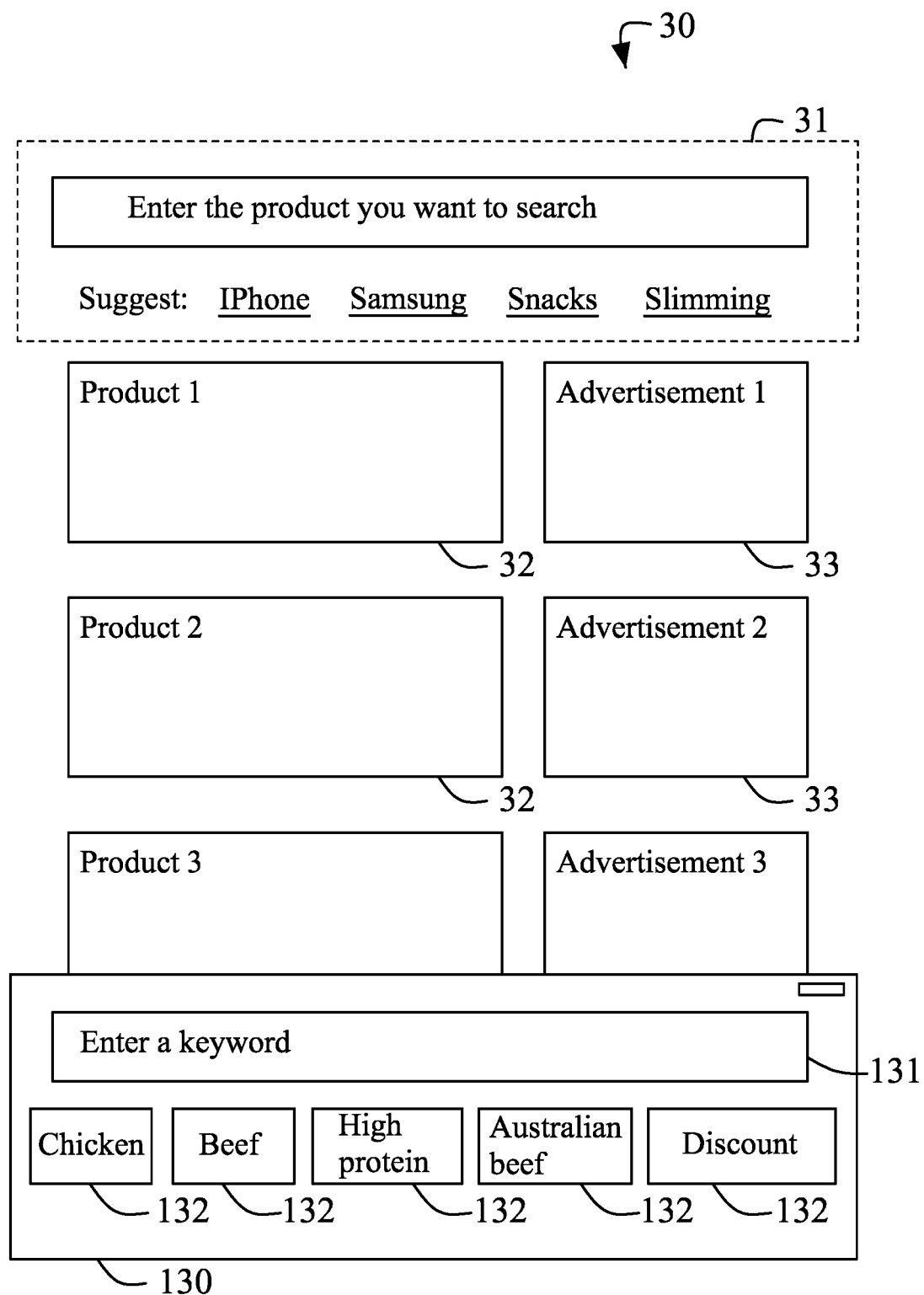
FIG. 2 is a diagram of the embedded search engine.

Please refer to FIG. 2. FIG. 2 is a diagram of the embedded search engine 130. In the embodiment of FIG. 2, the website server 10 is a shopping website. When the consumer terminal 140 connects to the website server 10, a webpage 30 is displayed. The webpage 30 includes a native search engine 31 of the website server 10, a plurality of products 32 and advertisements 33, wherein the embedded search engine 130 is also displayed on the webpage 30. Further, the embedded search engine 130 includes a search field 131 and a plurality of keyword fields 132, wherein the plurality of keyword fields 132 is used for displaying the keyword data stored in the first keyword database 122.

In one embodiment, when the embedded search engine 130 is loaded by the consumer terminal 140, a keyword request is transmitted to the server host 120. A plurality of keyword data is selected from the first keyword database 122 by the server host 120, and the selected keyword data is transmitted to and displayed on the embedded search engine 130. Furthermore, when the same keyword request is issued from different consumer terminals 140, the server host 20 will select different keyword data to be displayed in the keyword fields of these consumer terminals 140. That is to say, different consumer terminals 140 have similar characteristics (such as, cookies or browsing records), and therefore they issue similar keyword requests. However, the server host 120 will not give exactly identical keyword data to be displayed on these consumer terminals 140. This can effectively verify the scores of different keywords in similar groups.

Figure 3:
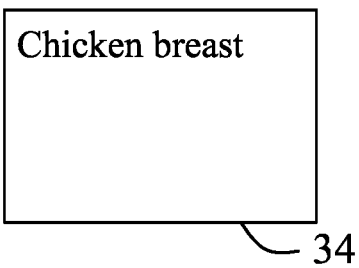
FIG. 3 is a diagram of a collection page.
Figure 3:
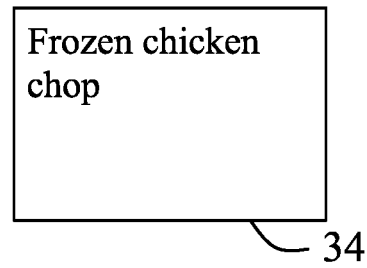
Figure 3:
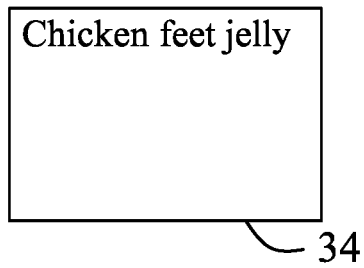
Figure 3:
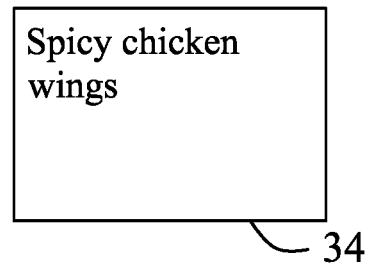
Figure 3:
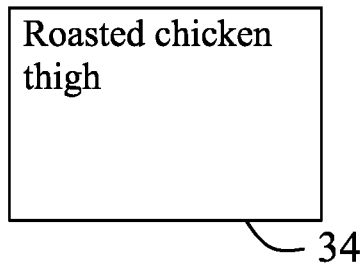
Figure 3:
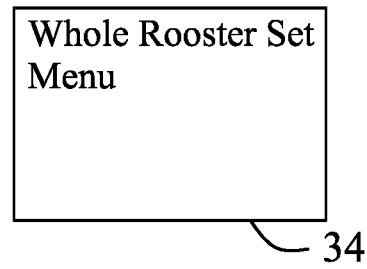
Figure 3:
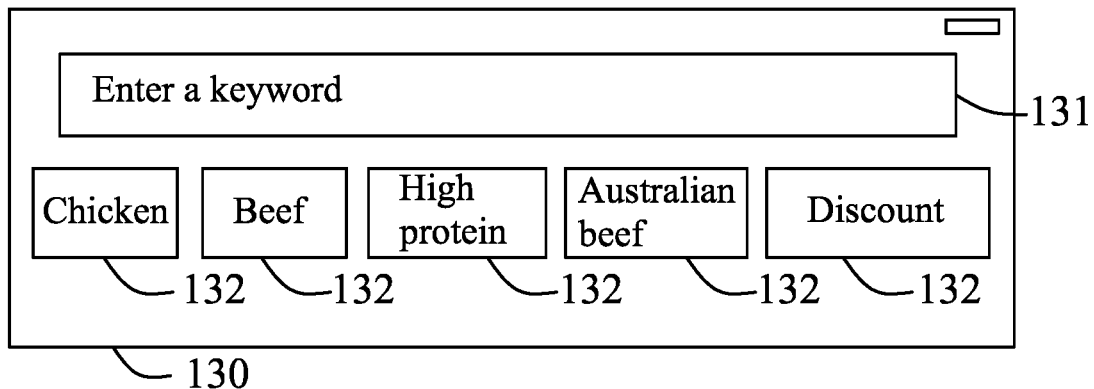

Please refer to FIG. 3. FIG. 3 is a diagram of a collection page. When the keyword data in the keyword fields 132 is clicked by the consumer terminal 140, for example, the keyword data of "chicken" is clicked, a collection page associated with "chicken" is displayed on the consumer terminal 140, wherein this collection page includes a product link 34 related to "chicken" in the website server 10, and can further display main icons (such as, product pictures) in the product link 34. In addition, the embedded search engine 130 will still be displayed at the bottom of the collection page, and the keyword data in the keyword fields 132 will also be replaced with the keyword data related to "chicken".

At this time, the consumers can click on the product link 34 or other keyword fields 132 on the collection page. If the consumer clicks the product link 34 on the collection page, the consumer terminal 140 will be connected back to the corresponding product page in the website server 10. If the consumer clicks other keyword fields 132, the consumer terminal 140 will be redirected to another collection page.

Furthermore, when the keyword data is inputted in the search field 131, a closest keyword data that is closest to the inputted keyword data is searched from the first keyword database 122 by the embedded search engine 130, the corresponding collection page is displayed on the consumer terminal 140, and the associated keyword data is displayed in the keyword field 132. That is to say, when the consumer does not click the keyword field 132 but inputs text in the search filed 131, the embedded search engine 130 selects the closest keyword data from the first keyword database 122 through a fuzzy search, and then the corresponding collection page is displayed on the consumer terminal 140. Therefore, even if the keyword data that does not exist in the first keyword database 122 is inputted in the search field 131, the embedded search engine 130 can still allow the consumer terminal to display the closest collection page.

It is worth mentioning that the embedded search engine 130 is not related to the native search engine 31 of the website, and the used databases are also different. The embedded search engine 10 obtains the keyword data from the first keyword database 122 of the keyword generation and verification system 100. The native search engine 31 obtains keyword data from the website server 10.

After the keyword data in the keyword field 132 is clicked, the second verification module 125 starts to track a browsing trajectory of the consumer terminal 140 until the consumer terminal 140 leaves the website server 10. At this time, the second verification module 125 modifies the score of the keyword data according to the content of the browsing trajectory.

In a first embodiment, a first keyword data is clicked on the consumer terminal 140, and then the corresponding collection page is entered. The product link 34 corresponding to the first keyword data is not clicked, and a second keyword data is clicked to enter another collection page. At this time, the second verification module 125 will downgrade the score of the first keyword data, because the first keyword cannot satisfy the consumer. After that, the second verification module 125 continues to track the browsing trajectory, but the subsequent browsing trajectory affects the score of the second keyword data.

In a second embodiment, a keyword data is clicked on the consumer terminal 140, and then the corresponding collection page is entered. One of the product links 34 corresponding to the keyword data is clicked. The second verification module 125 will increase the score of the keyword data, because the keyword successfully guides the consumer to enter the product page.

In a third embodiment, a keyword data is clicked on the consumer terminal 140, and then the corresponding collection page is entered. One of the product links 34 corresponding to the keyword data is clicked, and then the product corresponding to the product link 34 is purchased. The second verification module 125 will greatly improve the score of the keyword data, because the keyword successfully guides the consumer to purchase the product. Further, different bonus scores can be given according to the degree of consumer's transaction behaviors, such as putting the product in a shopping cart, clicking to confirm the transaction, or paying the bill.

In other words, the second verification module 125 corrects the score based on commercial benefits (such as, product exposure and sales possibility) generated by the keyword data. After the score is corrected, the second verification module 125 stores the keyword data with the score higher than the threshold in the first keyword database 122, and stores the keyword data with the score lower than the threshold in the second keyword database 123. That is, after the score is corrected, determining whether the keyword can continue to be used according to its score.

Therefore, the keyword data will be verified by the first verification module 124 and the second verification module 125 to check the degree to which the keyword is used (such as, the click-through rate) and the commercial value that can be generated (such as, the guiding traffic and consumption).

In one embodiment, the keyword data marked as the in-use state will not be stored in the second keyword database 123 by the first verification module 124 or the second verification module 125. The keyword data marked as the not-used state will not be stored in the first keyword database 122 by the first verification module 124 or the second verification module 125. In other words, the keyword data inputted by the website administrator through the first keyword input module 112 will be scored by the first verification module 124 or the second verification module 125, but will not be stored in the second keyword database 123 even if its score is lower than the threshold. Hence, this keyword data will be kept in the first keyword database 122 and displayed on the embedded search engine 130. On the contrary, the keyword data inputted by the website administrator through the second keyword input module 113 will only be stored in the second keyword database 123, and will not be scored or displayed on the embedded search engine 130.

In another embodiment, the keyword data stored in the second keyword database 123 is transmitted to the first verification module 122 and the second verification module 123 at regular intervals to re-obtain the score. That is to say, even if the keyword data stored in the second keyword database 123 is unusable in principle, the server host 121 will still periodically re-score the keyword data. The reason is that the usability of keyword is dynamic and may change with market trends at any time. Therefore, even keywords with poor usability need to be re-scored regularly to avoid missing keywords that are usable in the future.

Figure 4:
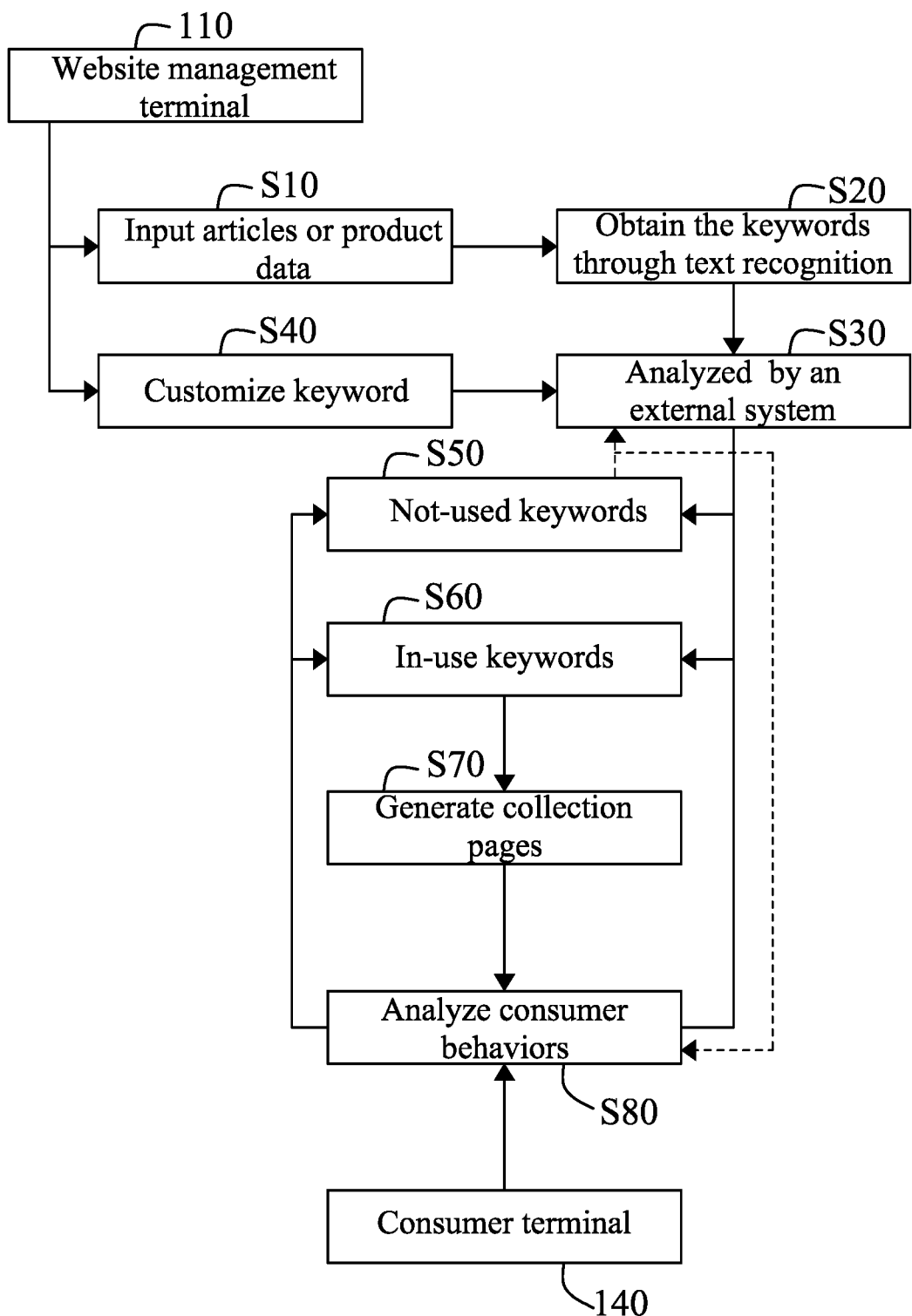
FIG. 4 is a flowchart of a verification method of a keyword generation

Please refer to FIG. 4. FIG. 4 is a flowchart of a verification method of a keyword generation and verification system. First, articles or product data are inputted by the website management terminal 110 (step S10, that is, input webpage data). At the same time, customized keywords are inputted by the website management terminal 110 (step S40). Then, the keyword generation and verification system 100 obtains the keywords through text recognition (step S20). After that, the obtained keywords (including the keywords obtained in step S20 and in step S40) are analyzed for the first time by an external system (step S30), and the keywords are divided into the keywords marked as a not-used state and the keywords marked as an in-use state according to the analysis results (step S60). Next, collection pages are generated from the keywords marked as the in-use state (step S70). Then, consumer behaviors on the collection pages are analyzed (step S80), and the scores of the keywords marked as the in-use state and the scores of the keywords marked as the not-used state are further modified. Through the steps above, the quality of keywords can be verified repeatedly.

The keyword generation and verification system 100 of the present invention separately verifies usage amount and commercial value of keywords through the first verification module 124 and the second verification module 125, and optimal keywords are selected through repeated score adjustments. At the same time, the keyword is displayed on the independent embedded search engine 130, allowing consumers to click to further quickly find desired products or articles.

While the preferred embodiment of the invention have been set forth for the purpose of disclosure, modifications of the disclosed embodiments of the invention as well as other embodiments thereof may occur to those skilled in the art.

Accordingly, the appended claims are intended to cover all embodiments which do not depart from the spirit and scope of the invention.

We claim:

1. A keyword generation and verification system, connected to an external website server and a keyword analysis system, the keyword generation and verification system comprising:
at least one website management terminal, comprising:
a webpage input module, configured for inputting a webpage data;
a first keyword input module, configured for inputting at least one keyword data, and the keyword data is marked as an in-use state; and
a second keyword input module, configured for inputting the keyword data, and the keyword data is marked as a not-used state;
a server host, communicatively connected to the website management terminal, the server host comprising:
a text recognition module, configured for receiving the webpage data, and analyzing the webpage data to obtain a plurality of keyword data;
a first keyword database;
a second keyword database;
a first verification module, configured for: obtaining the keyword data from the first keyword input module, the second keyword input module and the text recognition module, and sending the keyword data to the keyword analysis system; providing a corresponding keyword data a score according to an analysis data fed back by the keyword analysis system; storing the keyword data with the score higher than a threshold in the first keyword database, and storing the keyword data with the score lower than the threshold in the second keyword database; and storing the keyword data marked as the in-use state in the first keyword database, and storing the keyword data marked as the not-used state in the second keyword database; and
an output module, configured for obtaining the keyword data with the score from the first keyword database, using the keyword data to obtain a plurality of URL links from the website server, and generating a plurality of collection pages, wherein the plurality of collection pages are corresponding to the keyword data;
an embedded search engine, communicatively connected to the sever host and disposed in the website server, the embedded search engine including a search field and a plurality of keyword fields, wherein the plurality of keyword fields is used for displaying the keyword data stored in the first keyword database; and
a plurality of consumer terminals, communicatively connected to the website server, configured for loading and displaying the embedded search engine when it is connected to the website server;
wherein when the keyword data in the keyword fields is clicked, the corresponding collection page is displayed on the consumer terminal;
wherein when the keyword data is inputted in the search field, a closest keyword data that is closest to the inputted keyword data is searched from the first keyword database, the corresponding collection page is displayed on the consumer terminal, and associated keyword data is displayed in the keyword field;
wherein the server host further comprises a second verification module; when the keyword data in the keyword field is clicked, the second verification module is configured for tracking a browsing trajectory of the consumer terminal on the website server, for modifying the score of the keyword data, for storing the keyword data with the score higher than the threshold value in the first keyword database, and for storing the keyword data with the score lower than the threshold value in the second keyword database;
wherein the keyword data marked as the in-use state will not be stored in the second keyword database by the first verification module or the second verification module;
wherein the keyword data marked as the not-used state will not be stored in the first keyword database by the first verification module or the second verification module.

2. The keyword generation and verification system according to claim 1, wherein the keyword data stored in the second keyword database is transmitted to the first verification module and the second verification module at regular intervals to re-obtain the score.

3. The keyword generation and verification system according to claim 1, wherein the first verification module is further configured for obtaining more keyword data based on the analysis data.

4. The keyword generation and verification system according to claim 1, wherein when the collection pages corresponding to the plurality of keyword data have the same URL link, these keyword data will form a plurality of composite keyword data.

5. The keyword generation and verification system according to claim 1, wherein when the embedded search engine is loaded by the consumer terminal, a keyword request is transmitted to the server host, a plurality of keyword data is selected from the first keyword database by the server host, and the selected keyword data is transmitted to and displayed on the embedded search engine.

6. The keyword generation and verification system according to claim 5, wherein when the same keyword request are issued from different consumer terminals, the server host selects different keyword data to be displayed in the keyword fields of these consumer terminals.

* * * * *